(12) United States Patent
Lin

(10) Patent No.: US 11,134,194 B2
(45) Date of Patent: Sep. 28, 2021

(54) ALWAYS-ON SYSTEM WITH MULTI-LAYER POWER MANAGEMENT

(71) Applicant: Himax Technologies Limited, Tainan (TW)

(72) Inventor: Chun Huang Lin, Tainan (TW)

(73) Assignee: Himax Technologies Limited, Tainan (TW)

( * ) Notice: Subject to any disclaimer, the term of this patent is extended or adjusted under 35 U.S.C. 154(b) by 10 days.

(21) Appl. No.: 16/802,239

(22) Filed: Feb. 26, 2020

(65) Prior Publication Data

US 2021/0266470 A1 Aug. 26, 2021

(51) Int. Cl.
*H04N 5/232* (2006.01)

(52) U.S. Cl.
CPC ... *H04N 5/232411* (2018.08); *H04N 5/23218* (2018.08)

(58) Field of Classification Search
CPC ........................ H04N 5/232411; H04N 5/23218
See application file for complete search history.

(56) References Cited

U.S. PATENT DOCUMENTS

| | | | | |
|---|---|---|---|---|
| 2011/0090377 A1* | 4/2011 | Smith | ................... | G06K 9/2054 348/241 |
| 2014/0368423 A1* | 12/2014 | Brenckle | ................ | G06F 3/017 345/156 |
| 2016/0091955 A1* | 3/2016 | Black | .................... | G06F 1/3293 702/189 |
| 2016/0094787 A1* | 3/2016 | Govil | ................... | G06F 3/0425 348/310 |
| 2017/0132466 A1* | 5/2017 | Gousev | .................... | G06F 3/013 |
| 2019/0146566 A1* | 5/2019 | Pineda de Gyvez | . | G06F 1/3228 713/322 |
| 2019/0222756 A1* | 7/2019 | Moloney | .................. | G06N 3/02 |
| 2019/0311748 A1* | 10/2019 | Rohleder | ............... | G11C 5/147 |
| 2019/0391635 A1* | 12/2019 | Lakkis | .................. | G06F 1/3243 |

\* cited by examiner

*Primary Examiner* — Jason A Flohre
(74) *Attorney, Agent, or Firm* — Donald E. Stout; Stout, Uxa & Buyan, LLP

(57) ABSTRACT

An always-on system with multi-layer power management includes an always-on portion that is powered in shutdown state and all power states while rest portions of the system are not powered in the shutdown state; a memory unit that is powered in sleep state to retain data in the memory unit; an input interface that is powered only in event detection state, in which at least one captured image is received from an image sensor, the event detection state beginning when a trigger signal is issued; an event monitor that detects motion in the captured image; a digital signal processor (DSP) that is powered only in computer vision state to perform image identification on the captured image if motion is detected; and an output interface is powered only in the computer vision state, a result of the DSP being outputted via the output interface.

19 Claims, 4 Drawing Sheets

| Power state | | Function |
|---|---|---|
| shutdown (SD) | | only always-on portion is powered to conserve power |
| sleep (SLP) | | memory is powered to retain data |
| event detection (ED) | trigger (TR) | input interface is powered to activate image sensor |
| | receive (RX) | receive image, which is then subjected to motion detection |
| computer vision (CV) | | DSP is powered to perform image identification |

FIG. 2

ALWAYS-ON SYSTEM WITH MULTI-LAYER POWER MANAGEMENT

BACKGROUND OF THE INVENTION

1. Field of the Invention

The present invention generally relates to power management, and more particularly to an always-on system with multi-layer power management.

2. Description of Related Art

Always-on sensing is a technique adaptable to a system with limited power (e.g., Internet of Things (IoT) with battery) to substantially reduce power consumption as a whole with high performance. As modern systems become more complicated with more functions, conventional always-on systems could not efficiently manage power consumption.

A passive infrared sensor (PIR), an ambient light sensor or a temperature sensor is usually adopted in an event-trigger system to save power. However, as sensors ordinarily suffer false alarm, a conventional always-on system triggered by a sensor still could not conserve substantial power consumption effectively.

A need has thus arisen to propose a novel scheme capable of overcoming drawbacks of power management methods in the conventional systems.

SUMMARY OF THE INVENTION

In view of the foregoing, it is an object of the embodiment of the present invention to provide an always-on system with multi-layer power management that is capable of effectively managing power consumption for always-on applications.

According to one embodiment, an always-on system with multi-layer power management has power states of shutdown, sleep, event detection and computer vision. The system includes an always-on portion, a memory unit, an input interface, an event monitor, a digital signal processor (DSP) and an output interface. The always-on portion is powered in the shutdown state and all the power states while rest portions of the system are not powered in the shutdown state. The memory unit is powered in the sleep state to retain data in the memory unit. The input interface is powered only in the event detection state, in which at least one captured image is received from an image sensor, the event detection state beginning when a trigger signal is issued. The event monitor detects motion in the captured image. The DSP is powered only in the computer vision state to perform image identification on the captured image if motion is detected. The output interface is powered only in the computer vision state, a result of the DSP being outputted via the output interface.

BRIEF DESCRIPTION OF THE DRAWINGS

FIG. 2 shows a table illustrating the power states of the system according to the embodiment of the present invention;

DETAILED DESCRIPTION OF THE INVENTION

Figure 1:
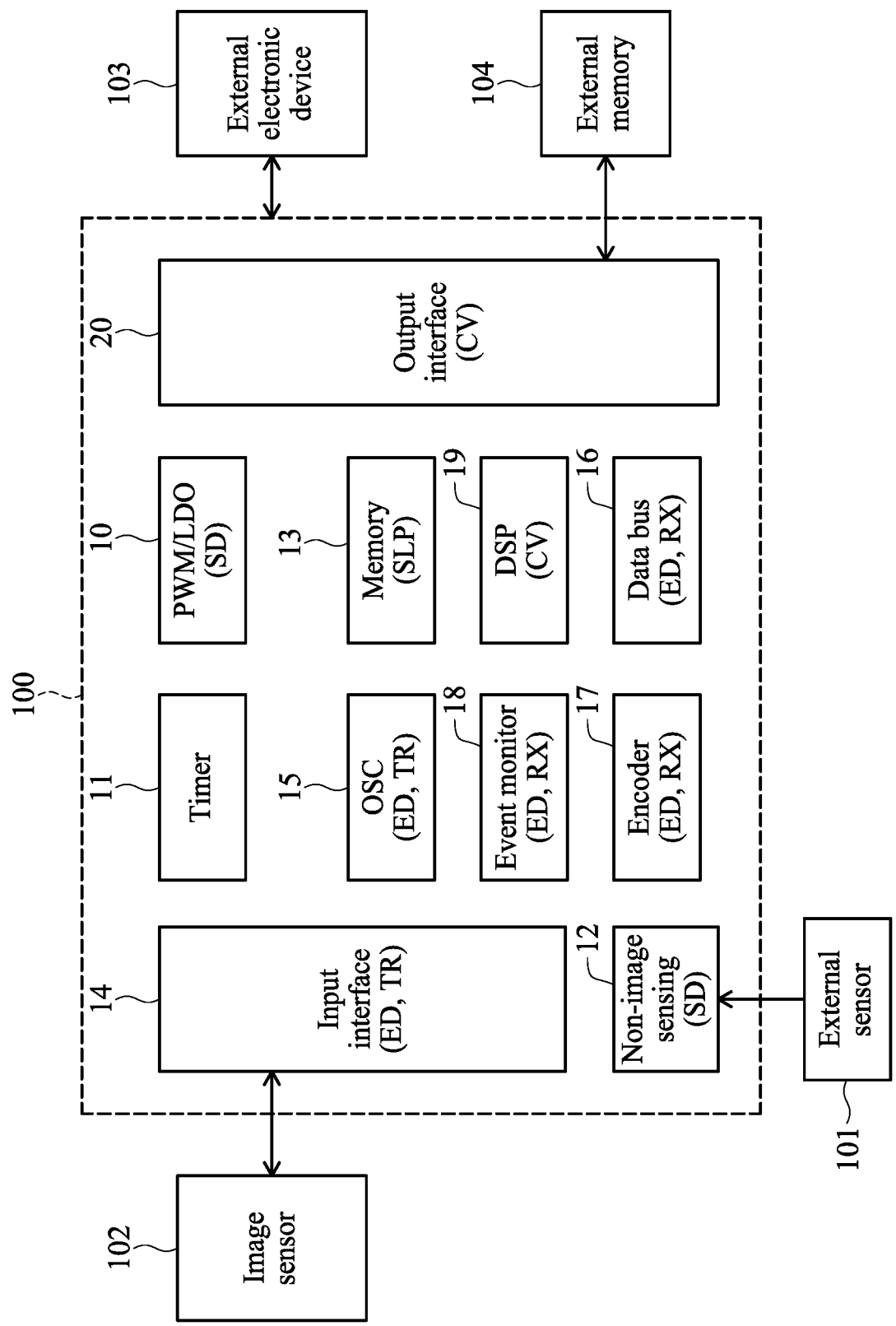
FIG. 1 shows a block diagram illustrating an always-on system with multi-layer power management according to one embodiment of the present invention.

FIG. 1 shows a block diagram illustrating an always-on system 100 with multi-layer power management according to one embodiment of the present invention. The always-on system 100 with multi-layer power management (system hereinafter) may be manufactured, for example, in a system on chip (SoC) that integrates all components of a system on a single microchip.

According to one aspect of the embodiment, the multi-layer power management of the system 100 may have at least the following power states: shutdown (SD), sleep (SLP), event detection (ED) and computer vision (CV). FIG. 2 shows a table illustrating the power states of the system 100 according to the embodiment of the present invention, and FIG. 3 shows a timing diagram illustrating signals associated with the power states in the time domain.

In the embodiment, the system 100 may include an always-on portion (denoted by SD) that, in the shutdown (SD) state, may be powered (e.g., by a battery) while rest portions of the system 100 are not powered. As indicated by the name, the always-on portion may be powered in all the states.

In one embodiment, the always-on portion may include a power management unit (PMU) 10. The PMU 10 may include at least one Pulse Width Modulation (PWM) unit and at least one voltage regulator (e.g., low-dropout regulator or LDO regulator) based on the system specification. The always-on portion may also include a timer 11 configured to count down from a predetermined time interval and to (regularly) issue a (first) trigger signal 31 (FIG. 3) indicating the time interval has expired. The always-on portion may further include a non-image sensing unit 12 configured to detect an event notified by an external sensor 101 such as passive infrared (PIR) sensor, ambient light sensor, temperature sensor or voice sensor, and to (irregularly) issue a (second) trigger signal 32 (FIG. 3) indicating a predetermined event has happened. The system 100 may include a memory unit 13, which may be powered in the sleep (SLP) state to retain data in the memory unit 13. In one embodiment, the memory unit 13 may be powered off only in the shutdown (SD) state.

Figure 3:
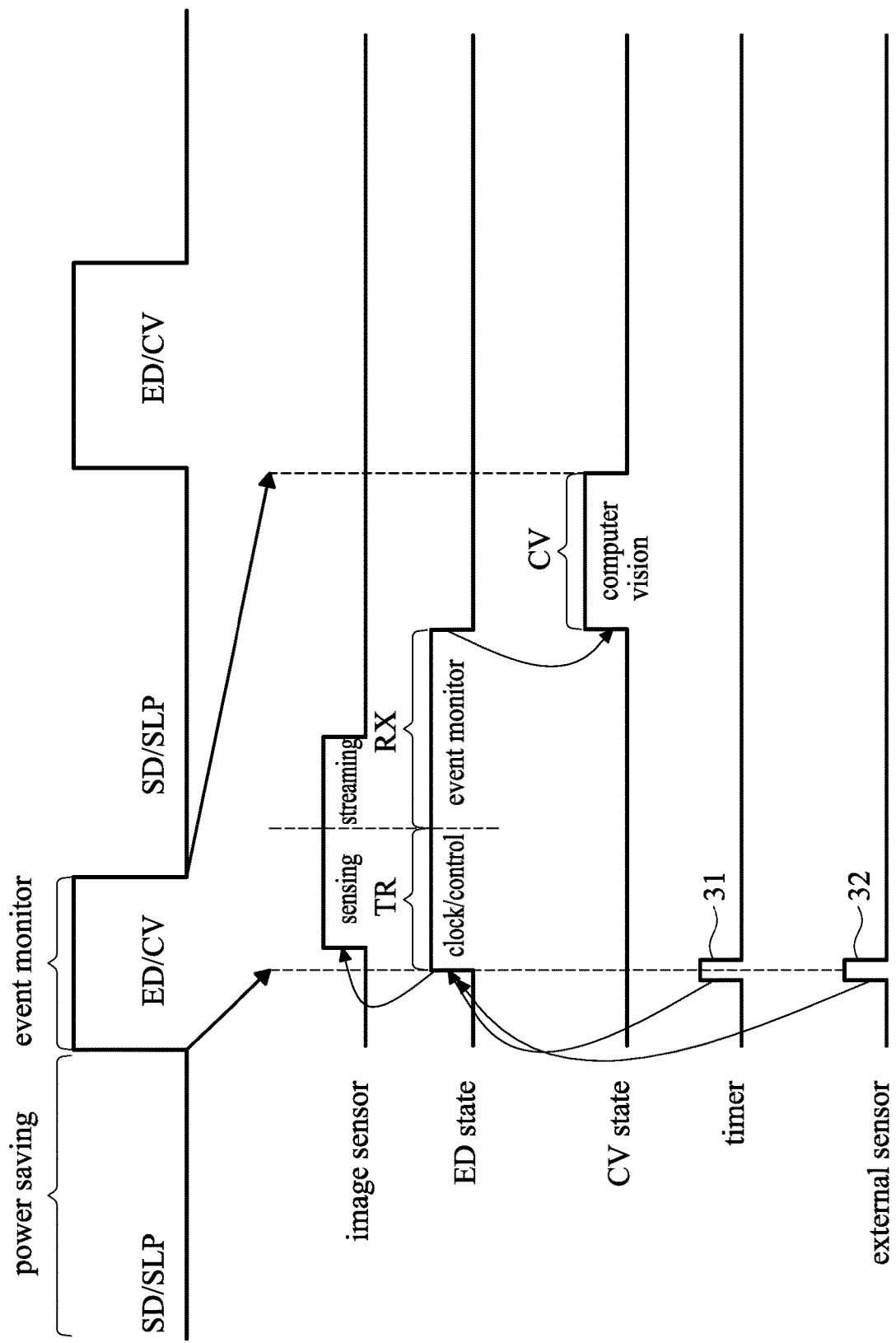
FIG. 3 shows a timing diagram illustrating signals associated with the power states in the time domain.

The event detection (ED) state may begin when the trigger signal 31/32 is issued by the timer 11 or the external sensor 101 as exemplified in FIG. 3. In the embodiment, the event detection (ED) state may be divided into two sub-states: trigger (TR) sub-state and receive (RX) sub-state, which are carried out in sequence.

In the trigger (TR) sub-state, an input interface 14, which may be regulated by an oscillator (OSC) 15, of the system 100 may be powered and activated. Specifically, the input interface 14 may output a clock signal and a control signal to an (external) image sensor 102 in order to activate the image sensor 102. Subsequently, the activated image sensor 102 may capture at least one image. In one embodiment, the input interface 14 and the oscillator 15 may be powered only in the trigger (TR) sub-state.

Next, in the receive (RX) sub-state, a data bus 16, an encoder 17 and an event monitor 18 of the system 100 may be powered. Specifically, the captured image may be received (streamed) via the data bus 16 and then be encoded by the encoder 17. Afterwards, the encoded image may be subjected to (image-based) motion detection by the event monitor 18 to detect motion in the image, for example, by determining whether image difference between a current image and a preceding image is greater than a predetermined threshold. Motion is detected if the image difference is greater than the predetermined threshold, otherwise no motion is detected. In one embodiment, the data bus 16, the encoder 17 and the event monitor 18 may be powered only in the receive (RX) sub-state. In an alternative embodiment, the input interface 14, the oscillator 15, the data bus 16, the encoder 17 and the event monitor 18 are all powered in the event detection (ED) state. In one embodiment, the memory unit 13 may be powered in the receive (RX) sub-state with a supply voltage larger than a supply voltage used in the sleep (SLP) state.

If motion is detected by the event monitor 18, the system 100 may enter the computer vision (CV) state, in which a digital signal processor (DSP) 19 and an output interface 20 may be powered. Specifically, the DSP 19 may perform image identification on the (encoded) captured image to identify human faces. It is noted that the DSP 19, capable of identifying human faces in the image, has processing capability being substantially greater than the event monitor 18, capable of only detecting motion in the image. In one embodiment, the DSP 19 and the output interface 20 may be powered only in the computer vision (CV) state.

When the image identification accomplishes, a result of the DSP 19 may be outputted, via an output interface 20, to an external electronic device 103 for further operation or process. The result of the DSP 19 may further be outputted to and stored in an external memory unit 104, via the output interface 20. In one embodiment, the external memory unit 104 may store a predetermined database, which may be utilized to support the image identification performed by the DSP 19.

Figure 4:
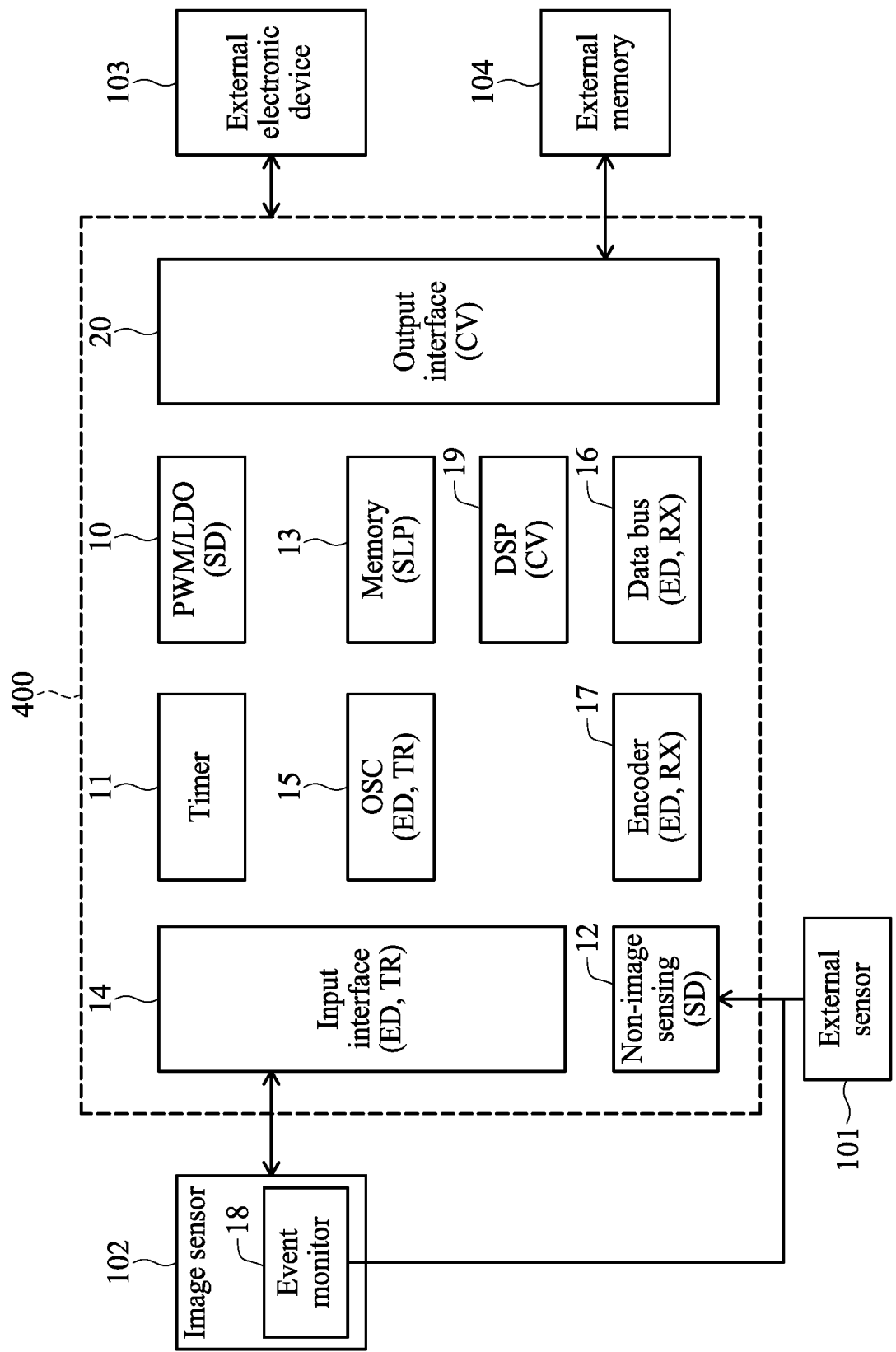
FIG. 4 shows a block diagram illustrating an always-on system with multi-layer power management according to a modified embodiment of the present invention.

FIG. 4 shows a block diagram illustrating an always-on system 400 with multi-layer power management according to a modified embodiment of the present invention. The always-on system 400 with multi-layer power management (hereinafter system) is similar to the system 100 (FIG. 1) with the following exceptions. In the present embodiment, the event monitor 18 may be disposed in the (external) image sensor 102. When motion is detected by the event monitor 18 of the image sensor 102, the event monitor 18 may notify the non-image sensing unit 12, and the system 400 may enter the computer vision (CV) state, in which the DSP 19 may perform image identification on the captured image to identify human faces.

Although specific embodiments have been illustrated and described, it will be appreciated by those skilled in the art that various modifications may be made without departing from the scope of the present invention, which is intended to be limited solely by the appended claims.

What is claimed is:

1. An always-on system with multi-layer power management, having power states of shutdown, sleep, event detection and computer vision, the system comprising:
    an always-on portion that is powered in the shutdown state and all the power states while rest portions of the system are not powered in the shutdown state;
    a memory unit that is powered in the sleep state to retain data in the memory unit;
    an input interface that is powered only in the event detection state, in which at least one captured image is received from an image sensor, the event detection state beginning when a trigger signal is issued;
    an event monitor that detects motion in the captured image;
    a digital signal processor (DSP) that is powered only in the computer vision state to perform image identification on the captured image if motion is detected;
    an output interface that is powered only in the computer vision state, a result of the DSP being outputted via the output interface; and
    an oscillator that is powered in the event detection state to regulate the input interface.

2. The system of claim 1, wherein the system is disposed in a system on chip (SoC).

3. The system of claim 1, wherein the always-on portion comprises a power management unit.

4. The system of claim 3, wherein the power management unit comprises a voltage regulator.

5. The system of claim 3, wherein the always-on portion further comprises:
    a timer that counts down from a predetermined time interval and issues a first trigger signal indicating the time interval has expired to begin the event detection state.

6. The system of claim 3, wherein the always-on portion further comprises:
    a non-image sensing unit that detects an event notified by an external sensor and issues a second trigger signal indicating a predetermined event has happened to begin the event detection state.

7. The system of claim 6, wherein the external sensor comprises a passive infrared (PIR) sensor, an ambient light sensor, a temperature sensor or a voice sensor.

8. The system of claim 6, wherein the event monitor is disposed in the image sensor, and the event monitor notifies the non-image sensing unit when motion is detected by the event monitor and the computer vision state begins.

9. The system of claim 1, wherein the memory unit is powered off only in the shutdown state.

10. The system of claim 1, wherein the event detection state is divided into two sub-states: trigger sub-state and receive sub-state, which are carried out in sequence.

11. The system of claim 10, wherein the input interface outputs a clock signal and a control signal, in the trigger sub-state, to the image sensor in order to activate the image sensor.

12. The system of claim 10, further comprising a data bus and an encoder that are powered in the receive sub-state, wherein the capture image is received via the data bus and then be encoded by the encoder before being subjected to motion detection by the event monitor.

13. The system of claim 12, wherein the data bus and the encoder are powered only in the receive sub-state.

14. The system of claim 12, wherein the data bus, the encoder and the event monitor are powered in the event detection state.

15. The system of claim 10, wherein the memory unit is powered in the receive sub-state with a supply voltage larger than a supply voltage used in the sleep state.

16. The system of claim 1, wherein the DSP has processing capability being substantially greater than the event monitor.

17. The system of claim 1, wherein the result of the DSP is outputted to and stored in an external memory unit via the output interface.

18. The system of claim 17, wherein the external memory unit stores a predetermined database, which is utilized to support the image identification performed by the DSP.

19. The system of claim 1, wherein the event monitor is powered only in the event detection state.

* * * * *